J. L. THOMPSON.
GRAIN THRESHER.
APPLICATION FILED MAR. 28, 1912.
1,063,227.
Patented June 3, 1913.
2 SHEETS—SHEET 1.
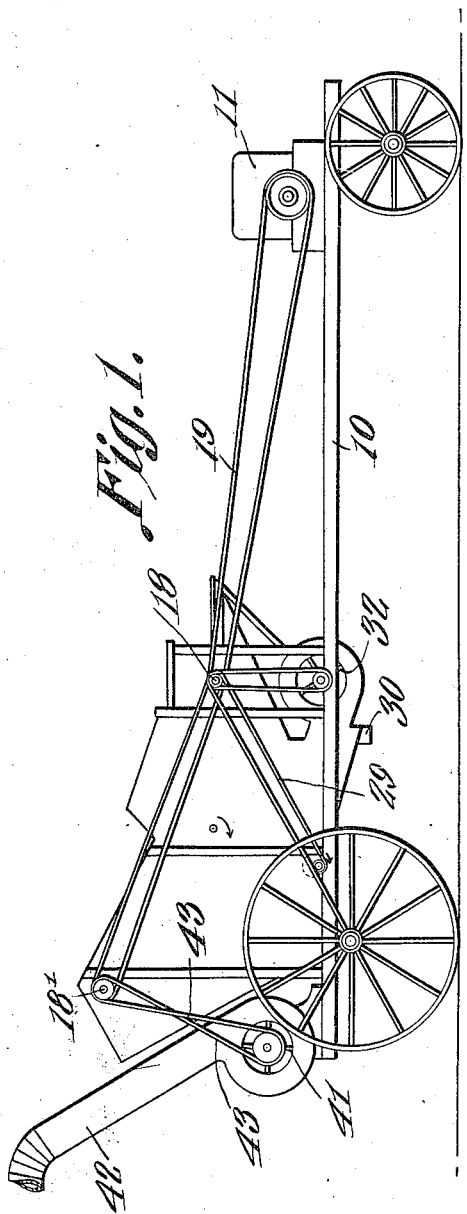
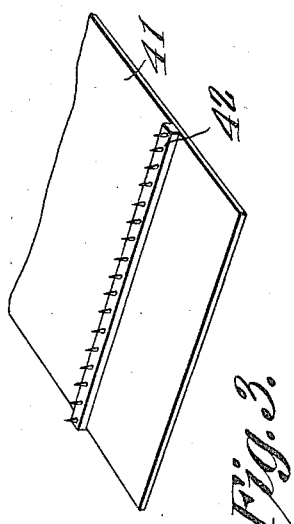
Witnesses
J. L. Thompson,
Inventor
by *C. A. Snow & Co.*
Attorneys

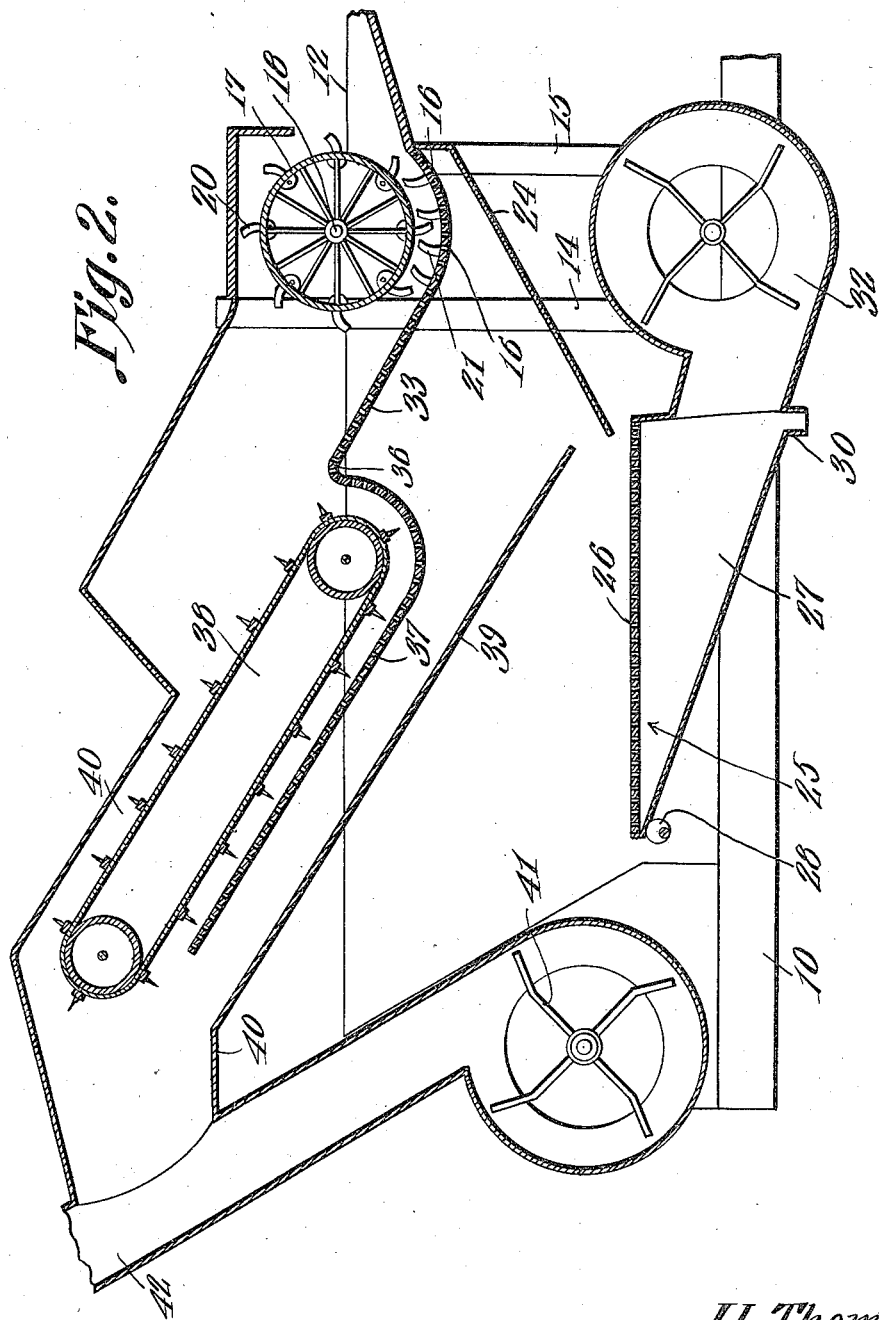

UNITED STATES PATENT OFFICE.

JOHN L. THOMPSON, OF VINSON, OKLAHOMA.

GRAIN-THRESHER.

1,063,227.

Specification of Letters Patent.

Patented June 3, 1913.

Application filed March 28, 1912. Serial No. 686,904.

*To all whom it may concern:*

Be it known that I, JOHN L. THOMPSON, a citizen of the United States, residing at Vinson, in the county of Harmon and State of Oklahoma, have invented a new and useful Grain-Thresher, of which the following is a specification.

This invention relates to an improvement in threshing machines.

The primary object of the invention is to provide a primary and secondary threshing mechanism which will deliver upon a vibrating grain shoe, independent blasts being directed upon said grain shoe and the tube through which the straw passes.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings Figure 1 is a side elevation. Fig. 2 is a longitudinal section. Fig. 3 is a detail view of a portion of the conveyer.

In the drawings, 10 designates the truck upon which the thresher is positioned, a motor 11 being arranged on said truck for driving the same. The threshing mechanism consists of a hopper 12 supported by uprights 14 and 15, said hopper 12 emptying into the perforated concaved receptacle 16. A drum 17 is mounted to rotate immediately above the concaved receptacle 16, the shaft 18 on which said drum is mounted being driven by a belt 19. The drum 17 is provided with a plurality of curved beaters 20 which co-act with curved projections 21 carried by the receptacle 16 to thoroughly thresh the grain. The grain falls through the apertures in the receptacle 16 upon a slanting deflector 24 to direct the same upon a grain shoe 25, said grain shoe consisting of a perforated member 26 which covers the receptacle 27, the same being agitated by an eccentric 28 which is driven by the belt 29, the grain passing through the member 26 as the same is agitated, and through the tubular extension 30 of the receptacle 27. The receptacle 27 is connected with a blast fan 32 which removes the chaff from the grain while the same rests upon the member 26 and as the same passes through the grain shoe 25.

The plate 33, one terminal of which forms the concaved receptacle 16, continues beyond the drum 17 being bent downwardly at the point 36 and formed with an extension 37 which underlies the straw conveyer 38, the deflecting plate 39 being disposed beneath the extension 37 of the plate 33.

The straw which falls on the lower portion 37 of the plate 33 is conveyed to the terminal of the plate by the conveyer 38, the grain being again threshed out of the same, passing through the perforations in the plate and falling upon the deflector 39. This deflector conveys the same to the deflector 24 and it then passes through the grain shoe 25 where it is subjected to the blast from the fan 32. The straw is conveyed to the terminal of the plate 37 and descends upon the slanting plate 40, the blast from the fan 41 driving the same through the spout 42, the fan being driven by the belt 43 which passes over a drive pulley arranged upon the shaft 18.

The many advantages of an apparatus of this character will be clearly apparent and it will be noted that a primary and secondary threshing mechanism is provided, the secondary threshing mechanism serving as a conveyer.

It will also be noted that a mechanism of this character may be supported upon a single truck and that the entire construction is such that the same may be easily and economically manufactured and the various parts readily assembled.

What is claimed is:

1. In a threshing machine the combination of a hopper, threshing means located adjacent and communicating with said hopper, a belt conveyer, an upwardly extending perforated plate composed of two portions lying in parallel planes and united by an arcuate portion conforming to the lower end of the said conveyer, said threshing means being adapted to allow the grain and chaff to fall therefrom and adapted to deliver the threshed material below and in contact with said belt conveyer, said belt conveyer being adapted to push the said material along the upper surface of said upwardly extending perforated plate, a discharge tube into which said material is delivered from said belt conveyer, a guide plate arranged beneath said upwardly extending perforated plate and adapted to guide any and all grain and chaff which falls from the threshed material during the conveying of the latter, means for guiding the grain and chaff falling from said threshing means upon a grain shoe.

2. In a threshing machine the combination of a perforated plate, a hopper adapted to deliver the material to be threshed to said perforated plate, said perforated plate provided with projections and having a drum adapted to rotate thereabove, said drum having projections adapted to interdigitate with the projections carried by said plate, said perforated plate extending upwardly and composed of two portions lying in parallel planes and united by an arcuate portion which conforms to the end of a belt conveyer, a belt conveyer adapted to move the threshed material along said perforated plate beneath said belt conveyer, a discharge tube into which said material is adapted to be delivered, a fan located at one end of said discharge tube and adapted to blow the threshed material out the other end thereof, a guide plate located beneath said perforated plate beneath said conveyer, a guide plate located beneath said perforated plate beneath said drum, said guide plates being adapted to guide the grain and chaff upon a grain shoe.

In testimony that I claim the foregoing as my own, I have hereto affixed my signature in the presence of two witnesses.

JOHN L. THOMPSON.

Witnesses:
H. B. JOYNER,
BYRON SMITH.

Copies of this patent may be obtained for five cents each, by addressing the "Commissioner of Patents. Washington, D. C."